United States Patent [19]

Moriyama et al.

[11] 3,864,022

[45] Feb. 4, 1975

[54] COLOR SWITCHING LIQUID CRYSTAL DISPLAY

[75] Inventors: Akio Moriyama, Katano; Masakazu Fukai, Nishinomiya; Komei Asai, Hirakata, all of Japan

[73] Assignee: Matsushita Electric Industrial Co., Ltd., Osaka, Japan

[22] Filed: Dec. 18, 1973

[21] Appl. No.: 425,857

[30] Foreign Application Priority Data
Dec. 19, 1972 Japan............................ 47-127848

[52] U.S. Cl............................ 350/160 LC, 252/299
[51] Int. Cl............................................. G02f 1/16
[58] Field of Search....... 350/150, 160 LC; 252/299

[56] References Cited
UNITED STATES PATENTS

| | | |
|---|---|---|
| 3,551,026 | 12/1970 | Heilmeier............................ 350/150 |
| 3,694,053 | 9/1972 | Kahn.................................... 350/150 |
| 3,703,329 | 11/1972 | Casellano............................ 350/150 |

Primary Examiner—Edward S. Bauer
Attorney, Agent, or Firm—Stevens, Davis, Miller & Mosher

[57] ABSTRACT

A color switching liquid crystal display consisting of a nematic liquid crystal which exhibits a homeotropic arrangement and having a negative dielectric anisotropy, and a combination of dyes of different display action characteristic mixed in the liquid crystal, thereby various color display being made possible by changing-over the display light through electronically controlling the liquid crystal. This device can eliminate the drawbacks of color shading or the weakness of colored light which are often the case with elements including only one kind of dye, and display an arbitrary color by the combination of dyes with different light absorption.

10 Claims, 11 Drawing Figures

FIG.2
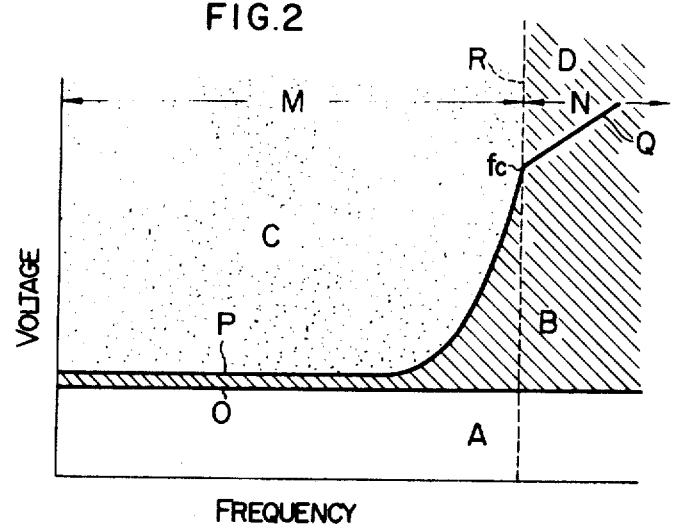
FIG.3A  FIG.3B  FIG.3C
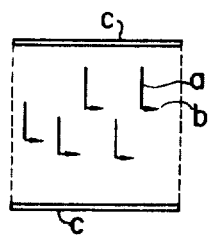 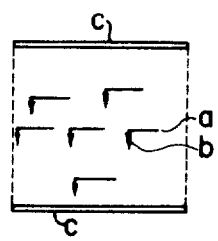 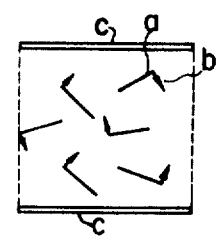

COLOR SWITCHING LIQUID CRYSTAL DISPLAY

This invention relates to a color switching liquid crystal display capable of various color display, and more particularly to a color switching liquid crystal display in which a nematic liquid crystal including a combination of dyes of different display action characteristics, exhibiting a homeotropic arrangement and having a negative dielectric anisotropy is electronically controlled to change-over the display color and achieving various color display.

The nematic liquid crystal element can be controlled to exhibit two kinds of differently colored display by applying an electric field having a voltage higher than the threshold voltage for re-alignment of the liquid crystal molecules and the voltage and a frequency not causing dynamic scattering, or by applying an electric field having a voltage higher than the threshold voltage for causing dynamic scattering and the voltage and a frequency capable of causing dynamic scattering.

Liquid crystal displays have various advantages such that flat display operation can be done at a low voltage and low power. Colorful display adds more valuable advantages.

Such methods of colored display utilizing a liquid crystal have been known in that:

1. external means such as a color filter or colored light is used in the display portion utilizing liquid crystal to color the liquid crystal;
2. liquid crystals containing dichromatic or pleochromatic dyes are controlled to change the absorption characteristics of the device by utilizing the absorption anisotropy of the dyes;
3. the birefringence of the liquid crystal itself disposed between two colored polarizers (a polarizer and an analyzer) is controlled to change the color.

This invention is basically along the line of said method (2), in which pleochromatic dye molecules mixed in a liquid crystal cause motions in co-operation with the liquid crystal molecules, change the absorption axis orientations and thereby change the absorption characteristics of the device under the application of an electric field.

Conventionally, most of the pleochromatic dyes used in such devices have such absorption characteristics that the color changes from the colorless or a nearly colorless state to a colored state by the application of an electric field. In a display using a nematic liquid crystal containing only dyes of such properties, the greater increase of the mixing ratio of the dye, the greater is the contrast but at a certain quantity it reaches the maximum. When the dye is added further, the number of dye molecules not oriented by the electric field increases and the contrast decreases. Further, in the absence of the electric field, the device may be colored by the non-aligned dye molecules to present an unfavorable results as a display. To avoid this coloring, it has been necessary to depress the concentration of the mixed dye equal to or lower than about 1 to 2 weight percent. As the result, the intensity of the colored light has been generally weak and could have been only weakly recognizable under normal interior illumination.

This invention is intended to avoid these drawbacks.

An object of this invention is to provide a color switching liquid crystal display of much usefulness.

Another object of this invention is to provide a color switching liquid crystal display capable of representing a display of high contrast.

A further object of this invention is to provide a color switching liquid crystal display comprising a liquid crystal including at least two kinds of dyes of different hue, at least one of which is a pleochromatic dye and at least two of which have different display action characteristics (i.e., the manner of hue change caused by the application of an electric field).

Another object of this invention is to provide a color switching liquid crystal display comprising a nematic liquid crystal representing a homeotropic structure in the absence of an electric field, having a negative dielectric anisotropy, and containing a combination of at least two kinds of dyes.

According to an embodiment of this invention, there is provided a color switching liquid crystal display comprising a liquid crystal element formed of a nematic liquid crystal representing a homeotropic arrangement in the absence of an electric field and having a negative dielectric anisotropy, and containing at least two kinds of dyes with different light absorption, at least one of which is a pleochromatic dye and at least two of which have mutually different display action characteristics under the influence of an electric field, and means for applying an electric field to said liquid crystal element. Said dyes are electronically controlled in said nematic liquid crystal representing a homeotropic structure and having a negative dielectric anisotropy. The combination of the dyes are selected as follows. Among the dyes to be mixed in a liquid crystal, at least one is a pleochromatic dye which exhibits a color change from a colored state to a colorless or nearly colorless state or to another colored state of different hue upon application of an electric field, and at least one is a dye which changes from a colorless state to a colored state, or exhibits no or little color change upon application of an electric field. In other words, the liquid crystal element contains at least two dyes of different hue at least one of which changes from a colored state to a colorless or nearly colorless state or to another colored state and at least one of which changes from a colorless to a colored state or exhibits no or little color change upon application of an electric field.

The drawbacks of the conventional liquid crystal display elements can be removed by the present invention, in which at least two dyes of different hue and different display action characteristics are mixed in combination into a liquid crystal. Namely, according to the present invention, the contrast between the background (normal state) and the figure (display image, excited state) is established between a color and another color of different hue. The excess dye molecules nonorientated in the absence of an electric field is mixed with other dye molecules and used for the purpose of exhibiting another color, and never reduces the contrast of the displayed figure. As is described above, since the display is made through the contrast between colors of the background and the figure, the mixing ratio of the dyes can be increased to increase the intensity of the colored light.

This invention is a color switching liquid crystal display including a mixture of dyes of different display action characteristics, and a combination of the control of molecular configuration for orientating the dye molecules and the nematic liquid crystal molecules in particular directions and the effective electric field control for activating these molecules. Display is made through the contrast between colors. Drawbacks such as color shading and the weakness of the intensity of colored light which are often the case with the conventional elements including only one kind of dye are eliminated. An arbitrary color can be displayed by a combination of dyes of different hue. Therefore, this invention is of great industrial value.

Now, the present invention will be described in more detail in conjunction with the accompanying drawings, in which:

FIG. 2 shows the range of electric field for activating the present device;

Figure 4A:
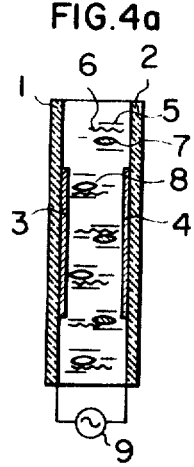
Figure 4B:
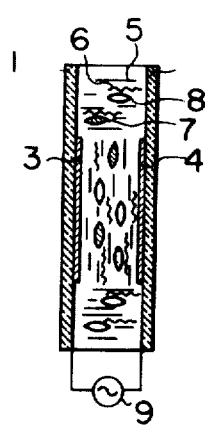
Figure 4C:
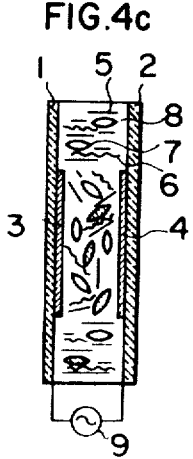
Figure 4D:
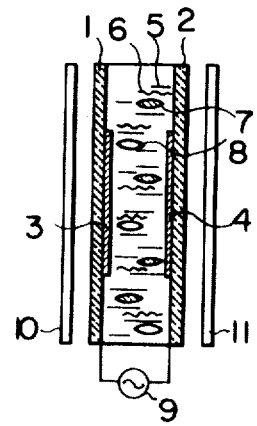
Figure 5:
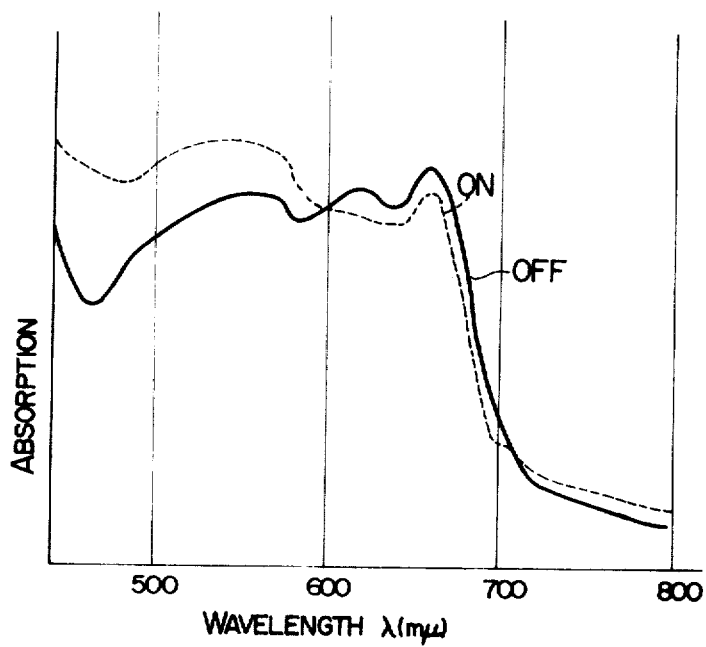

FIGS. 3A, 3B and 3C schematically show the configurations of liquid crystal molecules in the present device;

FIGS. 4a to 4d schematically show the configuration of molecules constituting the present liquid crystal element; and FIG. 5 shows the change in the absorption characteristics of an embodiment of the present liquid crystal element according to the presence and absence of an electric field.

From the viewpoint of the display action characteristics (how the color changes from the state when no electric field is applied to the state when an electric field is applied), dyes can be classified into four groups as shown in Table 1.

absorption axis of the dye molecules aligned along the liquid crystal molecules and more particularly on the hue change when a nematic liquid crystal is used which forms a homeotropic structure and has a negative dielectric anisotropy and when an electric field is applied which causes the rotational rearrangement of the molecules.

Figure 1A:
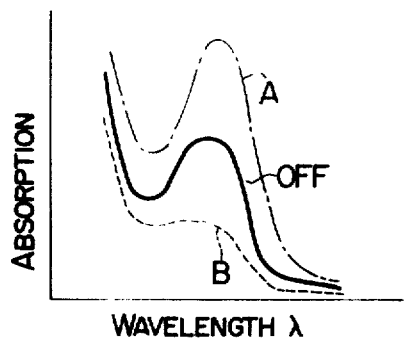
FIGS. 1a and 1b show the absorption characteristics of a liquid crystal containing one kind of dye.
Figure 1B:
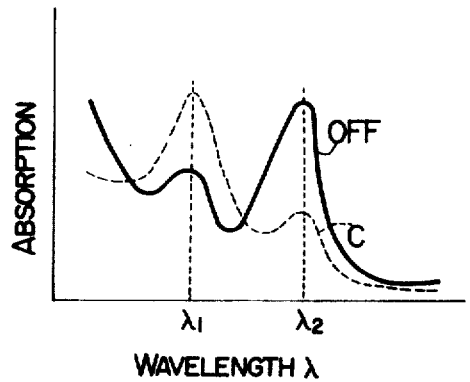

FIGS. 1a and 1b show typical absorption characteristics of a liquid crystal containing one kind of these dyes, in which the abscissa represents the wavelength and the ordinate represents absorption. In the figures, solid curves denoted by OFF represent the absorption spectra in the absence of an electric field, and chain and dotted curves A, B and C represent the absorption spectra when an electric field to cause rotational rearrangement of molecules is applied to a liquid crystal layer. Namely, when a dye classified in A is mixed in a liquid crystal, the absorption spectrum changes from the curve OFF to the curve A when such an electric field is applied. Similarly, the curves B and C represents the absorption spectra of the device containing respective dyes B and C and applied with an electric field. Apparently, when a dye D is mixed, the absorption spectrum does not show any appreciable change in the visible region by the application of an electric field.

The present device includes at least two dyes of different hue, belonging to at least two of said groups A, B, C, D.

Examples of the combination of two dyes of different display action characteristics and the change of displayed color accompanied by the combination are listed in following Table 2.

Table 2

| Dye M | | Dye N | | Color change of the device | |
|---|---|---|---|---|---|
| Electric field OFF (hue of background) | Electric field ON (hue of figure) | Electric field OFF (hue of background) | Electric field ON (hue of figure) | Electric field OFF (hue of background) | Electric field ON (hue of figure) |
| Colored (A) | Colorless or nearly colorless (A') | Colorless of nearly colorless (B) | Colored (B') | A + B | A' + B' |
| | | Colored (C) | Colored with another hue (C') | A + C | A' + C' |
| | | Colored (D) | No change (D') | A + D | A' + D' |
| Colored (C) | Colored with another hue (C') | Colorless or nearly colorless (B) | Colored (B') | C + B | C' + B' |
| | | Colored (C) | Colored with another hue (C') | C + C | C' + C' |
| | | Colored (D) | No change (D') | C + D | C' + D' |
| Colored (D) | No change (D') | Colorless or nearly colorless (B) | colored (B') | D + B | D' + B' |

Table 1

| | Color under no electric field | Color under the application of an electric field |
|---|---|---|
| A | Colored | Colorless or nearly colorless |
| B | Colorless or nearly colorless | Colored |
| C | Colored | Colored with different hue |
| D | Colored | No or little color change |

The classification in the above Table 1 is based on the relative relation of the orientation of the configuration of liquid crystal molecules and the orientation of the The letters A to D and A' to D' in the Table 2 denotes the color given to the device and the combinations of these letters, e.g., A + B and A' + B' represent the color given to the device by the combination of the dyes M and N.

The Table 2 represents examples of the case when each one kind of dyes M and N having different hues and different display action characteristics are mixed in a liquid crystal. The number of combinations can be increased infinitely by increasing the kinds and number of dyes. According to the present invention, a nematic liquid crystal exhibiting, in the absence of an electric field, a homeotropic structure and a negative dielectric anisotropy and containing at least two kinds of said dyes is used. In case where a nematic liquid crystal having a negative dielectric anisotropy is used, a change in the homeotropic structure, i.e., the longitudinal axes of molecules being aligned perpendicular to the surface of the vessel containing the molecules in a larger region, can be induced by applying an electric field which acts on the dipole component perpendicular to the longitudinal axis. The absorption anisotropy of the dyes can be effectively utilized by controlling the configuration of such molecules.

The homeotropic structure can be formed, for example, by the following methods.

a. An additive for controlling the configuration of the molecules is added to a liquid crystal (e.g., dodecyltrimethylammonium bromide, gallic acid cetyl ester, etc.).

b. A material which controls the configuration of the molecules such as lecithin is coated on a glass substrate.

c. A glass substrate is surface-treated with dichromic acid-sulfuric acid mixture, fluoric acid, etc.

d. An evaporation film of metal oxide, metal fluoride, etc. is formed on a glass substrate.

According to the invention, to a liquid crystal layer in which the configuration of the molecules is controlled in said manner, a controlling electric field is applied. The application of such a controlling voltage is done in two manners:

1. a voltage higher than the threshold voltage for realignment and a voltage and a frequency which does not cause dynamic scattering; and 2. a voltage higher than the threshold for causing dynamic scattering and a voltage and a frequency capable of causing dynamic scattering. A liquid crystal is operated in a different display manner in these two cases. Namely, according to the former case (1), only a color change occurs, whereas according to the latter case (2) both a variation in color and a light intensity modulation occur.

FIG. 2 shows the region of the effective voltage and frequency for causing said two ways of activation system. In the figure, the former way of applying an electric field (1) corresponds to a hatched region and the latter way of applying an electric field (2) corresponds to a dotted area.

In the figure, the abscissa represents frequency and the ordinate represents voltage, curves O, P and Q denote respectively the threshold voltage for causing realignment, the threshold voltage for causing dynamic scattering and the threshold voltage for the appearance of the chevron pattern. The curves P and Q are to be represented by the Helfish-Orsay theory. The operating mechanism is different in the "conducting region M" and the "dielectric region N" with a boundary at the cut-off frequency $f_c$. Therefore, the curves have a neck which has different dependence on the voltage and the frequency.

Namely, the area of the way of applying an electric field (1) is bordered by said curves O, P and Q and the border R of the cut-off frequency $f_c$ and hence includes areas B and D, whereas the area of the way (2) includes an area C bordered by said curves P and R. In a region A bordered by the curve O, the liquid crystal layer does not respond to an electric field and does not cause any change.

FIGS. 3A to 3C show the change in the configuration of molecules in a nematic liquid crystal in a element by the application of an electric field. When no electric field or an electric field belonging to the region A of FIG. 2 is applied, the liquid crystal molecules are aligned to have the longitudinal axis $a$ perpendicular to the opposite electrodes $c$ in a larger region as is shown in FIG. 3A.

When an electric field satisfying the above condition (1) is applied, a dipole component $b$ of the liquid crystal molecule in a direction perpendicular to the longitudinal axis of the liquid crystal molecule is influenced to induce rotational re-configuration to bring the longitudinal axes of the liquid crystal molecules $a$ in parallel to the larger area of the opposite electrode $c$ as is shown in FIG. 3B.

When an electric field satisfying the above condition (2) is applied to the liquid crystal element, the configuration of the liquid crystal molecules is randomly disturbed by the ionic current in the liquid crystal to orientate the longitudinal axes of the molecules in random directions.

In the above processes, the orientation of the absorption axes of the mixed dye molecules are changed in company with the change in the orientational configuration of the liquid crystal molecules, thereby changing the absorption characteristics of the device.

Hereinbelow, the structure, the manufacturing method and the test of the present device will be described in detail based on the preferred embodiment.

FIGS. 4a to 4d show the structure of a present liquid crystal device schematically, particularly the molecular configuration in a liquid crystal cell and the relation with the activation mode. FIG. 4a schematically shows the configuration of the molecules constituting the liquid crystal element when no electric field or an electric field in said region A of FIG. 2 is applied, FIG. 4b shows similarly the configuration of the constituent molecules of the liquid crystal element when an electric field satisfying said condition (1) is applied, and FIG. 4c the configuration of the constituent molecules of the liquid crystal element when an electric field satisfying said condition (2) is applied. FIG. 4d schematically shows another display mode in which a liquid crystal cell is disposed between polarizers 10 and 11.

In the figures, numerals 1 and 2 denote glass substrates, 3 and 4 transparent electrodes formed of indium oxide, 5 nematic liquid crystal molecules, 6 molecules of an additive having a property of controlling the orientation of the molecules, 7 and 8 dye molecules of different absorption anisotropy, 9 a D,C. or A.C. voltage source, and 10 and 11 polarizers.

As an example, a liquid crystal is formed of equal weight mixture of p-anisylidene-p-n-heptylaniline, p-ethoxybenzylidene-p-n-butylaniline, and p-n-propoxybenzylidene-p-n-penpylaniline, etc. with an additive for controlling the orientation of molecules which is 2 weight percent of gallic acid cetyl ester. Dyes each of which exhibits the display action characteristics as shown in Table 3 by the application of an electric field when singly mixed in a liquid crystal are combined as shown in Table 4, heated, stirred and dissolved sufficiently to leave no solid material, and mixed in such a liquid crystal.

Table 3

| Dye | Color in the presence of an electric field | Color in the absence of an electric field |
|---|---|---|
| I. (1,4-bis(butylamino)anthraquinone structure) | Colorless or nearly colorless | Blue |
| II. (bis-azo dye with naphthol, C6H5–N=N–C6H4–N=N–naphthol-OH) | Red | Colorless or nearly colorless |
| III. C6H5–N=N–C6H4–N(CH3)2 | Yellow | Colorless or nearly colorless |

Table 4

| Sample number | Composition of dyes (weight percent) | | |
|---|---|---|---|
| | Dye I | Dye II | Dye III |
| 1 | 1 | 1 | 0 |
| 2 | 1 | 0 | 1 |
| 3 | 1 | 1 | 1 |
| 4 | 2 | 0.5 | 0 |
| 5 | 1 | 1 | 3 |

Table 5

| Sample number | Color of device | |
|---|---|---|
| | Electric field OFF (background) | Electric field ON (displayed figure) |
| 1 | Violet | Red |
| 2 | Green | Yellow |
| 3 | Brown | Red |
| 4 | Blue | Red |
| 5 | Green | Orange red |

Among the dyes listed in the Table 3, the dyes II and III are typical ones having such absorption characteristics which are similar to those of many other dyes. The dye I is a special one having such an absorption characteristic which has not been found in the relevant fields. These dyes have the drawback that, when singly mixed in a liquid crystal, as the mixing ratio is increased, the dye molecules may not be oriented in a nematic liquid crystal layer to leave the color. Further, when the mixing ratio is small, the light intensities of the background color and the display image color are poor and can be only weakly recognized under normal interior illumination.

The display colors of the samples listed in the Table 4 in the absence of an electric field and in the presence of an electric field satisfying said condition (1) (e.g. 20 V, 1 KHz) are listed in Table 5. As is apparent from the Table, colored display is done with a contrast between color to color by the change of the display colored light.

Similarly, when an electric field satisfying the condition (2) (e.g., 20 V, 60 Hz) is applied to a nematic liquid crystal, the liquid crystal molecules begin dynamic scattering. Thereby, the liquid crystal becomes no longer transparent as in the former case. In the mixture with the scattered light, however, similar color as that of the former case appears mainly.

In devices using samples as listed in the Table 5, excess and non-oriented dye molecules were coupled with other dyes mixed together and never caused any disturbance of the color in the display surface.

FIG. 5 shows an example of the absorption characteristic of the present device including the sample 1 of the Table 5 between electrodes separated by a gap of 10 microns, in which the solid curve denoted by OFF represents the absorption characteristic when the electric field is cut off and the broken curve ON represents the absorption characteristic when an electric field of 20 V and 1 KHz is applied to the liquid crystal through said electrodes.

The samples listed in the Table 5 had the threshold voltage for re-alignment at about 5 V when the frequency was 100 Hz. therefore, such device can be controlled by a voltage above this value.

Beside the above embodiment, typical examples of the nematic liquid crystal having a negative dielectric anisotropy may be formed of the compounds such as p-anisylidene-p-n-butylaniline, p-anisylidene-p-aminophenylacetate, p-azoxyanisol, p-(p-ethoxyphenylazo)phenylheptanoate, or n-butyl-p-(p-ethoxyphenoxycarbonyl) phenylcarbonate.

Other dyes exhibiting a similar absorption characteristic as that of the dye I in the Table 3 are those such as Kayeset Blue 214 (trademark, Nippon Kayaku).

Dyes representing similar absorption characteristics as those of the dyes II and III in the Table 3 can be found in many dyes, for example those represented by the chemical formulae

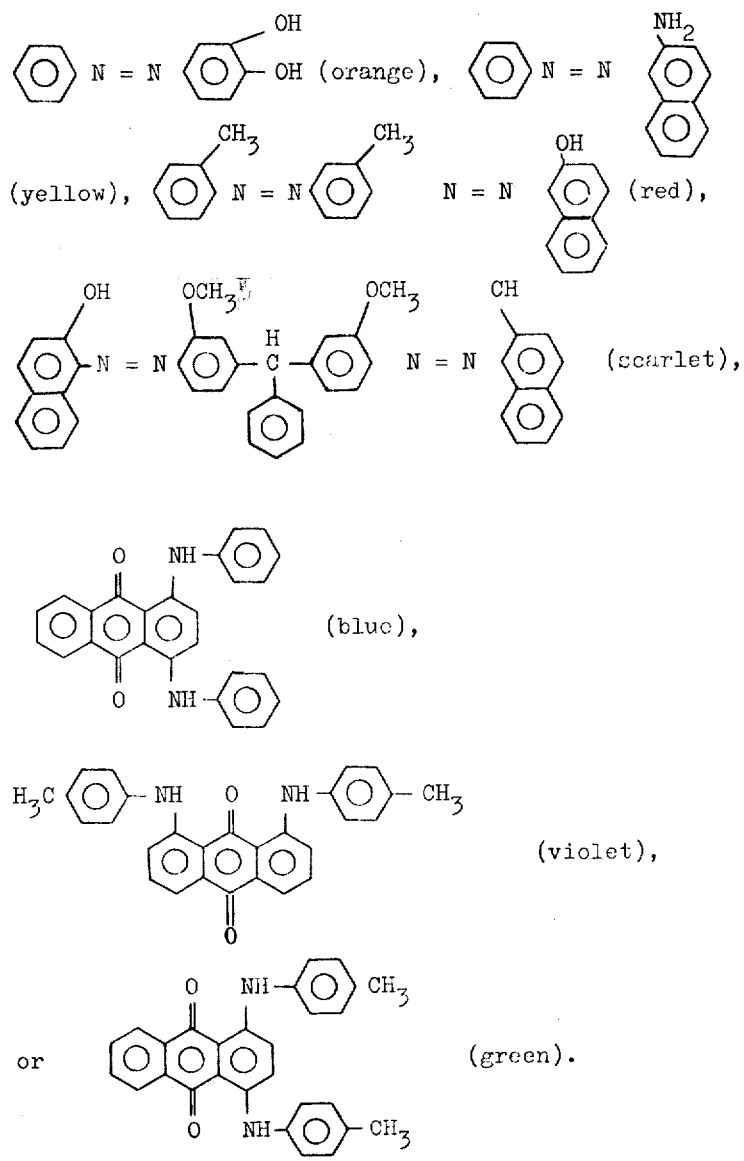

Further, as those known in the field based on the conventional techniques, those dyes are known to change from one color to another color of different hue which are p-dimethylaminocinnamylidene-2',4'-dinitrophenylhydrazone, or p-dimethylaminobenzylidene-2',4'-dinitrophenylhydrazone, etc.

Another type of operation can be adopted as is illustrated in FIG. 4d, in which crossed polarizers are placed in front and at the back of a liquid crystal element respectively. When no electric field is applied, the light cannot transmit through the device by the crossed polarizers so that the whole surface of the device is seen dark. When an electric field is applied, the light injected through the first polarizer is further polarized by the deformation of the liquid crystal molecules and can partially transmit through the second polarizer to exhibit a light given by the dye.

What we claim is:

1. A color switching liquid crystal display comprising:
   a liquid crystal element formed of a nematic liquid crystal which in the absence of an electric field exhibits a homeotropic arrangement and has a negative dielectric anisotropy, and including at least two kinds of dyes of different light absorption at least one of which is a pleochromatic dye, and at least two of which exhibit mutually different display action characteristics under the effect of an electric field; and
   means for applying an electric field to said liquid crystal element.

2. A color switching liquid crystal display according to claim 1, in which at least one kind of dye is a pleochromatic dye which changes from a colored state to a colorless state and at least one kind of dye among the rest of the dyes changes from a colorless state to a colored state by the application of an electric field.

3. A color switching liquid crystal display according to claim 1, in which at least one kind of dye is a pleochromatic dye which changes from a colored state to another colored state of different hue, and at least one kind of dye among the rest of the dyes changes from a colorless state to a colored state by the application of an electric field.

4. A color switching liquid crystal display according to claim 1, in which at least one kind is a pleochromatic dye which changes from a colored state to a colorless state and at least one kind of dye among the rest of the dyes changes from a colored state to another colored state of different hue by the application of an electric field.

5. A color switching liquid crystal display according to claim 1, in which at least one kind of dye is a pleochromatic dye which changes from a colored state to another colored state of different hue, and at least one kind of dye among the rest of the dyes changes from a colored state to another colored state of different hue.

6. A color switching liquid crystal display according to claim 1, in which at least one kind of dye is a pleochromatic dye which changes from a colored state to a colorless state, and at least one kind of dye among the rest of the dyes causes substantially no hue change by the application of an electric field.

7. A color switching liquid crystal display according to claim 1, in which at least one kind of dye is a pleochromatic dye which changes from a colored state to another colored state of different hue, and at least one kind of dye among the rest of the dyes causes substantially no hue change by the application of an electric field.

8. A color switching liquid crystal display according to claim 1, in which at least one kind of dye changes from a colorless state to a colored state and at least one kind of dye among the rest of the dyes causes substantially no hue change by the application of an electric field.

9. A color switching liquid crystal display according to claim 1, in which said means for applying an electric field generates an electric field having a voltage higher than the threshold voltage for re-alignment of the liquid crystal molecules and the voltage and a frequency not causing dynamic scattering.

10. A color switching liquid crystal display according to claim 1, in which said means for applying an electric field generates an electric field having a voltage higher than the threshold voltage for causing dynamic scattering and the voltage and a frequency capable of causing dynamic scattering.

* * * * *